United States Patent
Baxter et al.

(10) Patent No.: US 12,528,041 B2
(45) Date of Patent: Jan. 20, 2026

(54) CARBON CAPTURE SYSTEM AND METHOD WITH EXHAUST GAS RECIRCULATION

(71) Applicant: Chart Energy & Chemicals, Inc., Ball Ground, GA (US)

(72) Inventors: Larry Baxter, Orem, UT (US); Ravikumar Vipperla, Katy, TX (US)

(73) Assignee: Chart Energy & Chemicals, Inc., Ball Ground, GA (US)

( * ) Notice: Subject to any disclaimer, the term of this patent is extended or adjusted under 35 U.S.C. 154(b) by 397 days.

(21) Appl. No.: 18/051,583

(22) Filed: Nov. 1, 2022

(65) Prior Publication Data

US 2023/0134621 A1    May 4, 2023

Related U.S. Application Data

(60) Provisional application No. 63/274,652, filed on Nov. 2, 2021.

(51) Int. Cl.
 *B01D 53/00*    (2006.01)
 *B01D 53/26*    (2006.01)
 *F25J 3/06*     (2006.01)

(52) U.S. Cl.
 CPC .......... *B01D 53/002* (2013.01); *B01D 53/26* (2013.01); *F25J 3/067* (2013.01);
 (Continued)

(58) Field of Classification Search
 None
 See application file for complete search history.

(56) References Cited

U.S. PATENT DOCUMENTS

| | | | | |
|---|---|---|---|---|
| 4,899,544 A | * | 2/1990 | Boyd | F01K 23/103 60/618 |
| 7,490,472 B2 | * | 2/2009 | Lynghjem | B01D 53/62 60/39.52 |

(Continued)

FOREIGN PATENT DOCUMENTS

| | | |
|---|---|---|
| EP | 0469781 A2 | 2/1992 |
| EP | 2665808 B1 | 11/2013 |
| EP | 3751105 A1 | 12/2020 |

OTHER PUBLICATIONS

International Search Report and Written Opinion for International Application No. PCT/US2022/048526 Dated Feb. 1, 2023.

(Continued)

*Primary Examiner* — Jenna M Maroney
(74) *Attorney, Agent, or Firm* — Cook Alex Ltd.

(57) ABSTRACT

A cryogenic carbon capture system includes a flue gas cooling device in fluid communication with a heat engine. The flue gas cooling device receives a fluid stream that is downstream from the heat engine and a cooled liquid coolant stream so that the fluid stream is cooled by the cooled liquid coolant stream and a cooled flue gas stream is formed. A cryogenic carbon capture unit receives at least a portion of the cooled flue gas stream and separates carbon dioxide from the first portion of the cooled flue gas stream so that a clean flue gas stream and a carbon dioxide stream are formed. A liquid coolant cooling device receives the clean flue gas stream and a liquid coolant stream and cools the liquid coolant stream using the clean flue gas stream so that the cooled liquid coolant stream is formed and provided to the flue gas cooling device. The heat engine is in fluid communication with the cryogenic carbon capture system and receives a portion of a split stream that is downstream from the flue gas cooling device as an exhaust gas recirculation stream and an air stream.

29 Claims, 4 Drawing Sheets

(52) U.S. Cl.
CPC .... *B01D 2257/504* (2013.01); *B01D 2258/01* (2013.01); *B01D 2258/0283* (2013.01); *B01D 2279/30* (2013.01); *F25J 2210/06* (2013.01); *F25J 2210/70* (2013.01); *F25J 2260/80* (2013.01)

(56) References Cited

U.S. PATENT DOCUMENTS

| | | | | |
|---|---|---|---|---|
| 7,819,951 | B2* | 10/2010 | White | C01B 32/50 |
| | | | | 95/193 |
| 7,976,803 | B2* | 7/2011 | Hooper | B01D 53/1475 |
| | | | | 122/7 D |
| 8,424,282 | B2* | 4/2013 | Vollmer | F02C 3/34 |
| | | | | 122/7 B |
| 8,741,225 | B2* | 6/2014 | Oppenheim | C10K 1/005 |
| | | | | 422/187 |
| 9,670,841 | B2* | 6/2017 | Mittricker | F02C 7/141 |
| 9,903,271 | B2* | 2/2018 | Oelfke | F02C 7/08 |
| 10,570,825 | B2* | 2/2020 | Huntington | F02C 1/08 |
| 2006/0248888 | A1* | 11/2006 | Geskes | F02M 26/08 |
| | | | | 60/599 |
| 2008/0155984 | A1* | 7/2008 | Liu | C01B 3/48 |
| | | | | 422/198 |
| 2008/0309087 | A1* | 12/2008 | Evulet | F02C 7/08 |
| | | | | 60/645 |
| 2011/0079017 | A1* | 4/2011 | Gulen | F02C 7/18 |
| | | | | 60/783 |
| 2011/0226010 | A1 | 9/2011 | Baxter | |
| 2013/0047576 | A1* | 2/2013 | Sander | F02C 3/34 |
| | | | | 60/39.182 |
| 2013/0145773 | A1* | 6/2013 | Kulkarni | F02C 3/34 |
| | | | | 60/39.5 |
| 2018/0209729 | A1* | 7/2018 | Baxter | F25J 3/067 |
| 2018/0216532 | A1* | 8/2018 | Smith | F02C 7/10 |
| 2024/0001282 | A1* | 1/2024 | Higginbotham | B01D 53/047 |

OTHER PUBLICATIONS

Abd-Alla, et al. "Using exhaust gas recirculation in internal combustion engines: a review", Energy Conversion and Management, Elsevier Science Publishers, vol. 43, No. 8, pp. 1027-1042 (2002).

Amritkar, et al. "Effect of Exhaust Gas Recirculation (EGR) in Internal Combustion Engine", International Research Journal of Engineering and Technology, vol. 3, No. 3, pp. 1180-1185 (2016).

Anonymous, "NOx Reduction by Exhaust Gas Recirculation—MAN explains—EGCSA.com", pp. 1-5 (2014).

Font-Palma, et al. "Review of Cryogenic Carbon Capture Innovations and Their Potential Applications" Journal of Carbon Research, vol. C, No. 58, pp. 1-18 (2021).

Kaleemuddin, et al. "Exhaust Gas Recirculation System Experimental study on two-cylinder di-rect injection diesel engine for BS-III emission compliant", Innovations in Fuel Economy and Sustainable Road Transport, pp. 1-26 (2011).

Marc-Oliver, et al. "Feasibility study of CO2 capture by anti-sublimation", Energy Procedia, vol. 4, pp. 1403-1410 (2011).

Vellaiyan, et al. "Carbon Dioxide Capture Via Liquid Nitrogen in Compression Ignition Engine", Nature Environment and Pollution Technology, vol. 14, pp. 427-430 (2015).

Wilson, et al. "2019 T-Trig Project Report Decarbonising the Transport System Evaluation o the Marine Application of Advanced Carbon Capture Technology", pp. 1-34 (2020).

Zu, et al. "Experimental study on diesel engine exhaust gas recirculation performance and optimum exhaust gas recirculation rate determination method", Royal Society Open Science, vol. 6, No. 6, pp. 1-14 (2019).

* cited by examiner

CARBON CAPTURE SYSTEM AND METHOD WITH EXHAUST GAS RECIRCULATION

CLAIM OF PRIORITY

This application claims the benefit of U.S. Provisional Application No. 63/274,652, filed Nov. 2, 2021, the contents of which are hereby incorporated by reference.

FIELD OF THE DISCLOSURE

The present disclosure relates generally to systems and methods for purifying gases and, more particularly, to a system and method for carbon capture that uses exhaust gas recirculation to increase carbon dioxide concentration of a cryogenic carbon capture system feed stream.

BACKGROUND

Gas purification of carrier or feed gases has been an important process in industry for many years. An example is the processing of combustion flue gases. Combustion flue gas consists of the exhaust gas from a fireplace, oven, furnace, boiler, steam generator, or other combustor. The combustion fuel sources include coal, natural gas, liquid hydrocarbons, black liquor and biomass. Combustion flue gas varies greatly in composition depending on the method of combustion and the source of fuel. Combustion using air leads to most of the flue gas consisting of nitrogen. The non-nitrogen flue gas consists of mostly carbon dioxide (or $CO_2$), water, and unconsumed oxygen. Small amounts of carbon monoxide, nitrogen oxides, sulfur dioxide, and trace amounts of hundreds of other chemicals are present, depending on the source. Entrained dust and soot will also be present in most combustion flue gas streams.

The separation of carbon dioxide from other light gases such as nitrogen is called carbon capture and is important for reducing $CO_2$ emissions and their associated environmental impacts. It is commonly believed that this $CO_2$ represents a significant factor in increasing the greenhouse effect and global warming. Therefore, there is a clear need for efficient methods of capturing $CO_2$ from flue gases to produce a concentrated stream of $CO_2$ that can readily be transported to a safe storage site or to a further application.

The minimum work required to separate a unit mass of $CO_2$ from the remaining flue gas depends on the purity of the $CO_2$ product, the fraction of $CO_2$ separated (captured), the initial amount of $CO_2$ in the gas. The initial $CO_2$ content affects this minimum energy much more than the other two variables, with specific energy demand (energy per unit mass of captured $CO_2$) increasing as the initial $CO_2$ content decreases.

The initial $CO_2$ content in an exhaust or flue gas increases in many combustion systems when a portion of the exhaust gas recirculates to the combustor inlet: a process known as exhaust gas recirculation (EGR). EGR applies primarily to systems that process substantially more air than is required for combustion, the primary examples of which are turbines (both simple- and combined-cycle) and reciprocating engines. EGR in reciprocating engines is a common technique used primarily for pollution control, but EGR in turbines is rare. Both turbines and reciprocating engines should often cool the recirculated exhaust gas to manage peak combustion temperatures or to improve process efficiency. For example, in a combined cycle where a turbine drives a generator and a compressor, an exhaust stream is cooled in a heat recovery steam generator with the resulting stream directed to a condenser.

As carbon capture becomes more prevalent, new systems and methods are needed to improve efficiency and/or provide other operational advantages for other carbon capture technologies.

SUMMARY OF THE DISCLOSURE

There are several aspects of the present subject matter which may be embodied separately or together in the methods, devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a system for separating carbon dioxide from an exhaust gas of a heat engine includes a heat engine configured to receive and consume a fuel stream so that a heat engine exhaust stream is produced and a cryogenic carbon capture system. The cryogenic carbon capture system includes a flue gas cooling device in fluid communication with the heat engine and having a flue gas cooling device outlet. The flue gas cooling device is configured to receive a fluid stream that is downstream from the heat engine and a cooled liquid coolant stream so that the fluid stream is cooled by the cooled liquid coolant stream and a cooled flue gas stream is formed. The cooled flue gas stream exits the flue gas cooling device through the flue gas cooling device outlet. A cryogenic carbon capture unit is in fluid communication with the flue gas cooling device outlet and is configured to receive at least a portion of the cooled flue gas stream and to separate carbon dioxide from the first portion of the cooled flue gas stream so that a clean flue gas stream and a carbon dioxide stream are formed. A liquid coolant cooling device is configured to receive the clean flue gas stream from the cryogenic carbon capture unit and a liquid coolant stream and to cool the liquid coolant stream using the clean flue gas stream so that the cooled liquid coolant stream is formed and provided to the flue gas cooling device. The heat engine is in fluid communication with the cryogenic carbon capture system and is configured to receive: (i) a portion of a split stream that is downstream from the flue gas cooling device as an exhaust gas recirculation stream; and (ii) an air stream.

In another aspect, a method for separating carbon dioxide from an exhaust gas of a heat engine includes the steps of cooling a fluid stream downstream from the heat engine using a cooled liquid coolant stream so that a cooled flue gas stream is formed; separating carbon dioxide from the cooled flue gas stream in a cryogenic carbon capture process so that a clean flue gas stream and a carbon dioxide stream are formed; cooling a liquid coolant stream using the clean flue gas stream so that the cooled liquid coolant stream is formed; and directing a portion of a split stream that is downstream from the initial cooling stop to the heat engine.

DETAILED DESCRIPTION OF EMBODIMENTS

It should be noted herein that the lines, conduits, piping, passages and similar structures and the corresponding streams are sometimes both referred to by the same element number set out in the figures.

Also, as used herein, and as known in the art, a heat exchanger is that device or an area in the device wherein indirect heat exchange occurs between two or more streams at different temperatures, or between a stream and the environment. In addition, all heat exchangers referenced herein may be incorporated into one or more heat exchanger devices or may each be individual heat exchanger devices. As used herein, the terms "communication", "communicating", and the like generally refer to fluid communication unless otherwise specified. And although two fluids in communication may exchange heat upon mixing, such an exchange would not be considered to be the same as heat exchange in a heat exchanger, although such an exchange can take place in a heat exchanger.

As used herein, the terms, "high", "middle", "warm", "cold" and the like are relative to comparable streams, as is customary in the art.

Reference numerals that are introduced in the specification in association with a drawing figure may be repeated in one or more subsequent figures for shared elements or components without additional description in the specification in order to provide context for other features.

In the claims, letters are used to identify claimed steps (e.g. a., b. and c.). These letters are used to aid in referring to the method steps and are not intended to indicate the order in which the claimed steps are performed, unless and only to the extent that such order is specifically recited in the claims.

Systems and methods of the disclosure use exhaust gas recirculation (EGR) to increase the CO2 concentration in an exhaust gas by separating a partial stream of the exhaust gas downstream of a heat engine, preferably cooling the gas, and mixing the separated stream with the incoming air. Systems and methods of the disclosure provide innovations with regard to the locations and extent of cooling involved in the recirculating stream and the potential use of the heat from the cooling in the carbon capture process.

In the case of simple- and combined-cycle turbines, the recirculated exhaust stream mixes with the inlet air upstream of the compressor. The compressed mixed stream exiting the compressor is directed to the turbine to aid in combustion and cooling. The illustrations in this disclosure show a combined-cycle system as the heat engine. However, the same procedures apply to other heat engines such as simple-cycle turbines, internal combustion engines and any system in which exhaust gas can substitute for a portion of the air feed stream.

Figure 1:
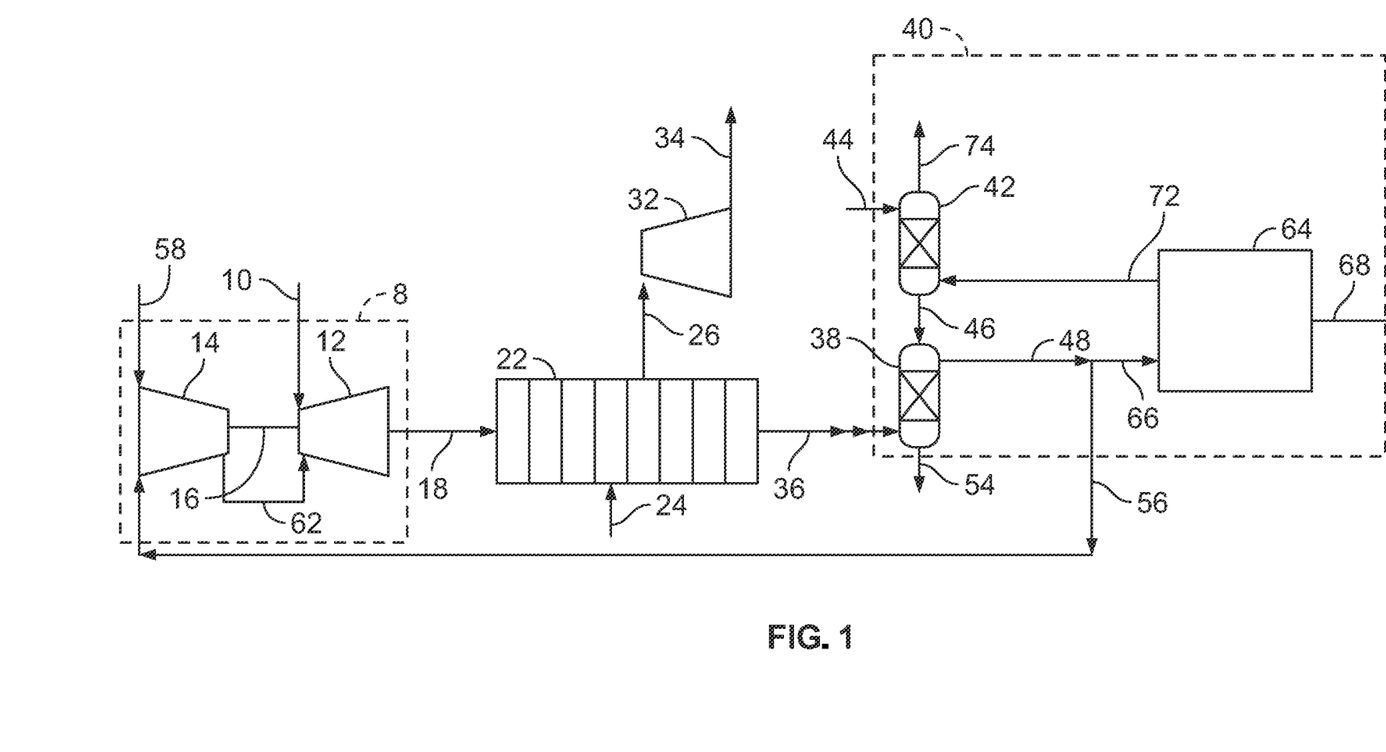
FIG. 1 is a process flow diagram and schematic illustrating a first embodiment the system and method of the disclosure.

A process flow diagram and schematic illustrating a first embodiment of the system and method of the disclosure is provided in FIG. 1. A fuel stream 10 is received and consumed by a heat engine 8. In one embodiment, the heat engine may include a turbine 12 of a combined-cycle that receives the fuel stream. As a result, the turbine 12 powers a compressor 14 via shaft 16. The turbine may also power a generator (not shown) or other system components. As an example only, the fuel stream 10 may include natural gas.

In alternative embodiments, the heat engine 8 may include a simple-cycle turbine, an internal combustion engine or any system in which exhaust gas can substitute for a portion of the air feed stream.

An exhaust gas stream 18 exits the heat engine 8 (which in the illustrated embodiment is turbine 12) and is directed in part or in total to an optional heat recovery heat exchanger that, in the illustrated embodiments, is integrated into a heat recovery steam generator (HRSG) 22. As is known in the art, the HRSG includes one or more heat exchangers that receive the flue gas stream 18 and a liquid stream 24 (typically water). The liquid stream is warmed by the exhaust gas stream in the HRSG 22 so that a stream of steam 26 is produced. The steam is directed to and turns a steam turbine 32 which may be used to power generators or other components. The steam turbine exhaust stream 34 exits the steam turbine while a cooled turbine exhaust stream exits the HRSG as flue gas stream 36. The flue gas stream 36 is directed in part or in total to a flue gas cooling device, such as cooling tower 38 of a cryogenic carbon capture system 40. Alternative cooling devices known in the art may be used in place of cooling tower 38, including, but not limited, to a horizontal duct with a liquid spray.

A liquid coolant cooling device, such as cooling tower 42 of cryogenic carbon capture system 40, receives a liquid coolant feed stream 44 and, as explained below, is cooled. Alternative cooling devices known in the art may be used in place of cooling tower 42, including, but not limited, to a horizontal duct with a liquid spray. As an example only, the liquid coolant may be water. The cooled liquid coolant stream 46 flows to the flue gas cooling tower 38. Due to passage of the flue gas stream 36 through the flue gas cooling tower 38, and contact with the liquid coolant stream 46 within the flue gas cooling tower 38, a cooled flue gas stream 48 exits the flue gas cooling tower 52. A warmed liquid coolant stream 54 exits the bottom of the flue gas cooling tower 12.

A portion of the cooled flue gas stream 48 branches off as exhaust gas recirculation stream 56. This stream is directed back to the heat engine 8, which in the illustrated embodiment includes a compressor 14, which also receives cooling air stream 58. Steams 56 and 58 are combined and compressed in compressor 14 of the heat engine so that a compressed mixed stream 62 is formed. This stream is directed to the turbine 12 to aid in cooling and combustion within the heat engine 8.

As an example only, approximately 30% of the cooled flue gas stream 48 may be diverted to form the exhaust gas recirculation stream 56. As examples only, a diverter, deflector plate or blowers positioned in line 48 or 56 may be used to divert a portion of stream 48 to form stream 56.

In alternative embodiments of the system of the disclosure, the exhaust gas recirculation steam 56 may branch off of any alternative location after the flue gas cooling tower 38 of the cryogenic carbon capture system 40. For example, the exhaust gas recirculation stream 56 may branch off of a stream of a cryogenic capture unit 64 or a clean flue gas stream 72, both of which are described below.

The cooled flue gas stream portion remaining after the exhaust gas recirculation stream 56 is diverted from stream 48 is directed to a cryogenic carbon capture unit 64 of the cryogenic carbon capture system 40 as carbon capture feed stream 66. Due to the exhaust gas recirculation (EGR) as described above, the carbon capture feed stream 66 has a higher carbon dioxide concentration and a lower mass flow rate (when compared to a system without EGR). As an example only, embodiments of the system of the disclosure may increase the carbon dioxide concentration of the carbon capture feed stream 66 from a level of 4% concentration to 10% concentration. A higher portion of the cooled flue gas stream 48, or other streams referenced above, may be diverted to stream 56 to further increase the carbon dioxide concentration of the carbon capture feed stream 66.

The carbon capture feed stream 66 entering the cryogenic carbon capture unit 64 is processed so that carbon dioxide is separated and directed out of the cryogenic carbon capture unit 64 as stream 68. A resulting clean flue gas stream 72 also exits the cryogenic carbon capture unit 64 and, in some embodiments, may be at a temperature at or below ambient temperature, and is directed to the coolant liquid cooling tower 42 of the cryogenic carbon capture system so that the coolant liquid stream 44 also entering the cooling tower 42 is cooled. The resulting warmed clean flue gas stream exits the coolant liquid cooling tower 42 as vent gas stream 74.

Any carbon capture technology known in the art may be used in the carbon capture system 40 or cryogenic carbon capture unit 64. As examples only, the carbon capture system 40 or the cryogenic carbon capture unit 64 may use the technology disclosed in U.S. Pat. Nos. 9,250,012; 9,410,736; 9,766,011; 10,537,823; 10,724,793; 10,213,731; 10,739,067; 10,969,169 and 10,995,984, all to Sustainable Energy Solutions, Inc., the contents of each of which are hereby incorporated by reference, as well as U.S. Patent Application Publication Nos. US 2020/0318900; US 2021/0299591; US 2018/0031315 and 2019/0192999, all owned by Sustainable Energy Solutions, Inc., the contents of each of which are also hereby incorporated by reference.

In alternative embodiments of the system, the flue gas cooling tower 38 and/or the liquid coolant cooling tower 42 may be integrated into or a part of the cryogenic carbon capture unit 64.

Figure 2:
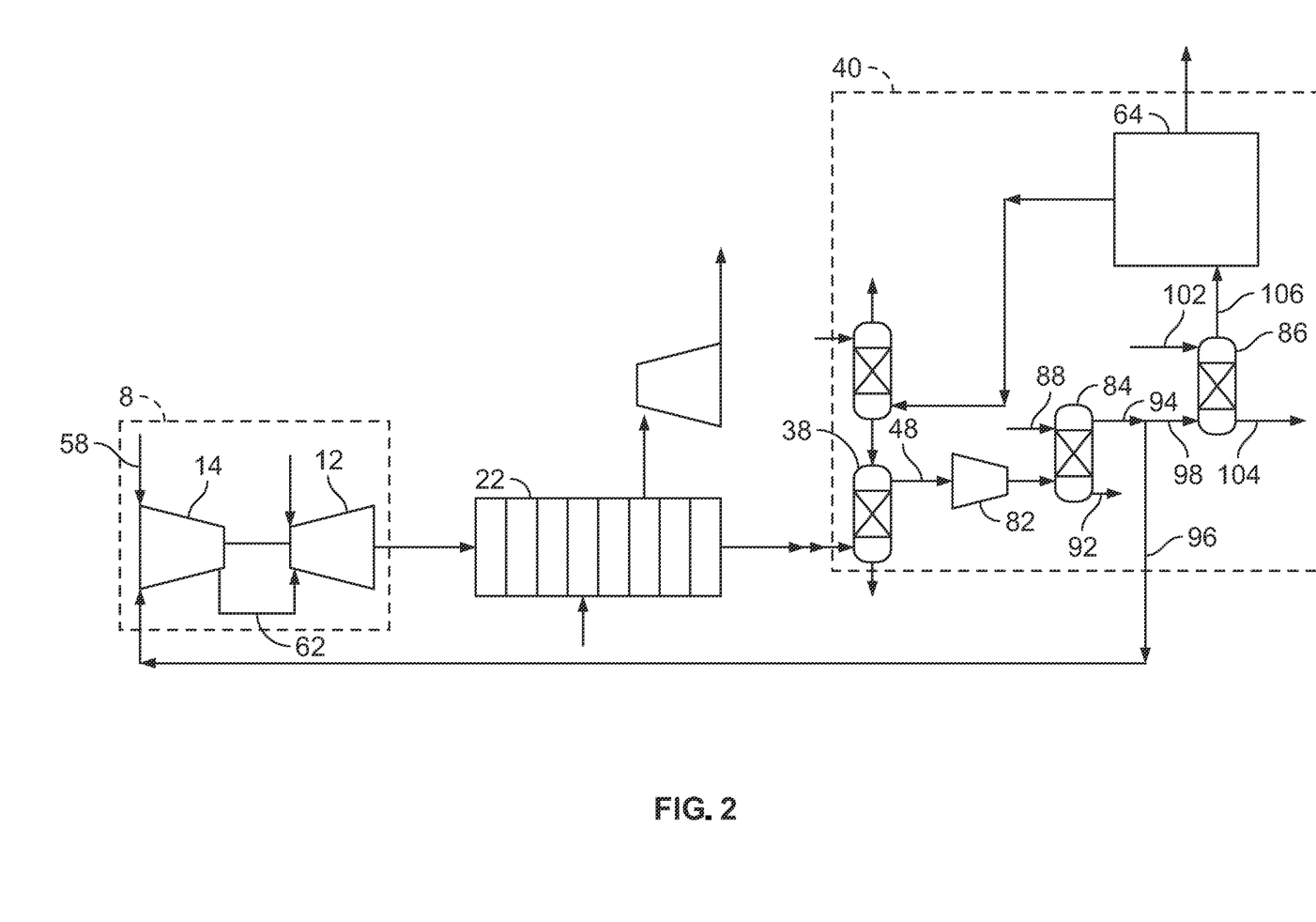
FIG. 2 is a process flow diagram and schematic illustrating a second embodiment of system and method of the disclosure.

In the embodiment of FIG. 2, a blower or booster fan 82, or other flow boosting device, and a pair of dryers, such as drying columns 84 and 86, have been added to the cryogenic carbon capture system 40 between the flue gas cooling tower 38 and the cryogenic carbon capture unit 64 of FIG. 1. While two drying columns are illustrated in FIG. 2, the system could instead feature a single drying column or more than two drying columns. Furthermore, alternative types of dryers known in the art could be used in place of drying columns 84 and 86. In addition, the blower or booster fan 82 could be omitted in alternative embodiments of the system. One or more blower or booster fans could also instead be positioned within any or all of lines 94, 96 and/or 98.

As illustrated in FIG. 2, the cooled flue gas stream 48 passes through the blower or booster fan 82 and is then directed to a first drying column 84.

The top portion of drying column 84 receives desiccant liquid stream 92. Cooled flue gas stream 48, after leaving the flow boosting device 82, enters the drying column 84 wherein it contacts the desiccant stream. As a result, the desiccant stream captures the water vapor from the cooled flue gas stream, and other potentially other components such as carbon dioxide, and exits as stream 92.

As examples only, the desiccant liquid streams may consist of a mixture of water and a compound from either of the following two groups: i) ionic compounds including potassium carbonate, potassium formate, potassium acetate, calcium magnesium acetate, magnesium chloride, sodium chloride, lithium chloride, and calcium chloride; and, ii) soluble organic compounds including glycerol, ammonia, propylene glycol, ethylene glycol, ethanol, and methanol.

A partially dried flue gas stream 94, which contains a reduced amount of water, exits the top of drying column 84. Similar to the embodiment of FIG. 1, a portion of the partially dried flue gas stream 94 branches off as exhaust gas recirculation stream 96. This stream is directed back to compressor 14 of the heat engine 8, which also receives cooling air stream 58. Steams 96 and 58 are combined and compressed in compressor 14 so that a compressed mixed stream 62 is formed. This stream is directed to the turbine 12 of the heat engine 8 to aid in cooling and combustion.

A remaining portion of the partially dried flue gas stream 94 flows as stream 98 to the second drying column 86 of the cryogenic carbon capture system 40. As for first drying column 84, the top portion of the second drying column 86 receives desiccant liquid stream 102. Stream 98 enters the second drying column 86 wherein it contacts the desiccant stream. As a result, the desiccant stream captures water vapor from the partially dried flue gas stream 98, and other potentially other components such as carbon dioxide, and exits as stream 104.

A further dried flue gas stream 106 exits the second drying column 86 and is directed to the cryogenic carbon capture unit 64, where further processing occurs as described above for FIG. 1.

In some embodiments, there can be removal of between 1% and 100% of the water vapor from the cooled flue gas stream 48 in the first and second drying columns 84 and 86.

Alternative types of dryers known in the art may be substituted for the desiccant dryers 84 and 86 of FIG. 2.

The embodiment of FIG. 2, by reducing the water content in exhaust gas recirculation stream 96, permits the temperature of stream 96 to be lower. More specifically, by reducing the water content of stream 96, freezing within the compressor 14 of the heat engine 8 does not occur until much lower temperatures. A lower temperature for stream 96 increases the mass flow rate through the compressor 14, which results in an increase in power for the turbine 12 of the heat engine 8. In some embodiments of the system of the disclosure, the temperature of the partially dry stream 94, and thus the temperature of exhaust gas recirculation stream 96, may be as low as 0° C.

In alternative embodiments of the system, the flue gas cooling tower 38, the liquid coolant cooling tower 42, the flow boosting device 82 and/or one or both of the first and second drying columns 84 and 86 may be integrated into or a part of the cryogenic carbon capture unit 64. Furthermore, in an alternative embodiment, a carbon capture unit dryer may be provided in the carbon capture unit 64 in place of dryers 84 and 86 along with a cryogenic carbon capture heat exchanger, where the cryogenic carbon capture unit dryer receives and dries the cooled flue gas stream so that a dried flue gas stream is formed and the cryogenic carbon capture unit heat exchanger receives and further cools the dried flue gas stream with a portion of the resulting stream being directed to the heat engine as the exhaust gas recirculation stream.

Figure 3:
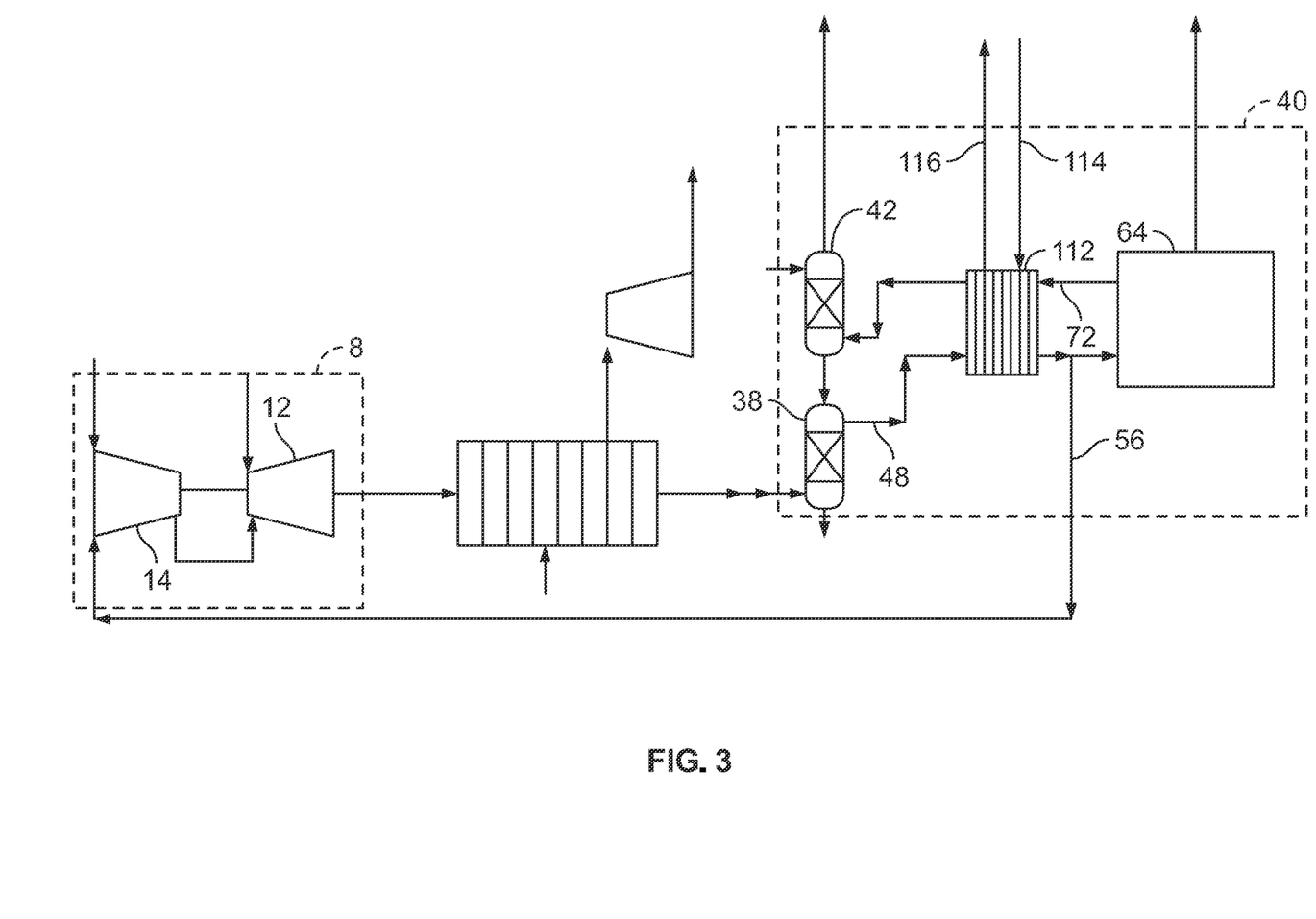
FIG. 3 is a process flow diagram and schematic illustrating a third embodiment the system and method of the disclosure.

In the system of FIG. 3, a supplemental heat exchanger 112 has been added between the flue gas and liquid coolant cooling towers 38 and 42 of the cryogenic carbon capture system 40 and the cryogenic carbon capture unit 64. The supplemental heat exchanger 112 receives a refrigerant stream 114 and therefore provides additional cooling for the cooled flue gas stream 48. This provides a lower temperature for the exhaust gas recirculation stream 56 so as to increase the mass flow rate through the compressor 14 and thus increase power in turbine 12. The supplemental heat exchanger 112 also provides further cooling of the clean flue gas stream 72 to enable lower cooling temperatures in the liquid coolant cooling tower 42.

A warmed refrigerant stream 116 exits the supplemental heat exchanger 112 and may be compressed and cooled in a closed loop refrigeration cycle to provide refrigerant stream 114. Alternatively, an open loop refrigeration system may be used to provide refrigerant stream 114.

As examples only, refrigerant stream 114 may include propane, a mixed refrigerant, R134A or any other refrigerant known in the art. In addition, alternative cooling devices known in the art may be used in place of the supplemental heat exchanger 112 of FIG. 3.

While illustrated in FIG. 3 as being part of the cryogenic carbon capture system 40, in alternative embodiments, the supplemental heat exchanger 112 may not be part of the cryogenic carbon capture system 40.

Figure 4:
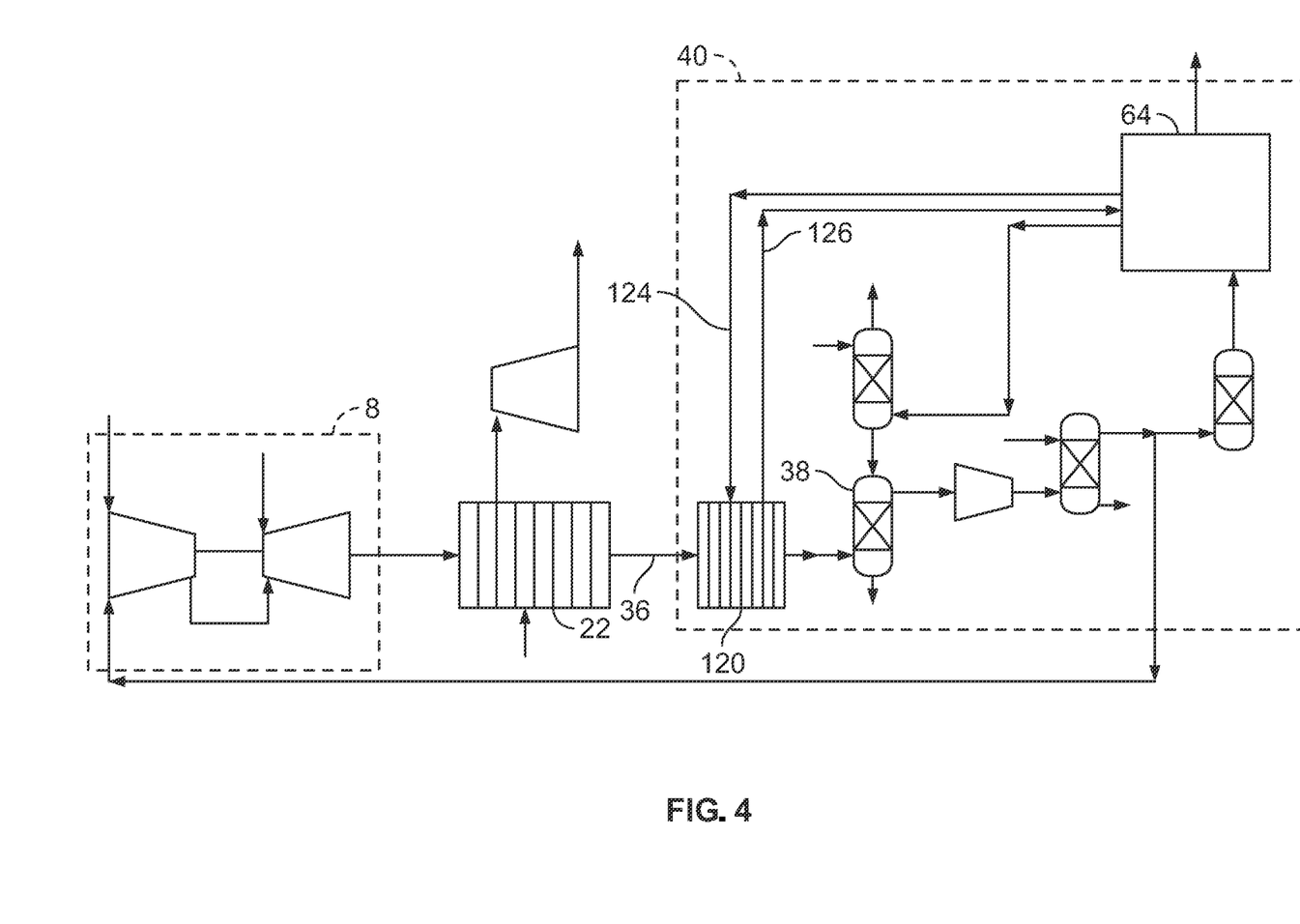
FIG. 4 is a process flow diagram and schematic illustrating a fourth embodiment the system and method of the disclosure.

In the system of FIG. 4, a supplemental heat recovery heat exchanger 120 has been added between the HRSG 22 and the flue gas cooling tower 38 of the cryogenic carbon capture system 40 of FIG. 2. The supplemental heat recovery heat exchanger 120 receives a cooling stream 124 from the cryogenic carbon capture unit 64 and therefore provides additional cooling for the flue gas stream 36 prior to the flue gas cooling tower 38. As an example only, the cooling stream 124 and the warmed return stream 126 may be a reboiler service from a distillation column of the cryogenic carbon capture unit 64.

While illustrated in FIG. 4 as being part of the cryogenic carbon capture system 40, in alternative embodiments, the supplemental heat recovery heat exchanger 120 may not be part of the cryogenic carbon capture system 40

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A system for separating carbon dioxide from an exhaust gas of a heat engine comprising:
   a. the heat engine configured to receive and consume a fuel stream so that the heat engine exhaust stream is produced;
   b. a cryogenic carbon capture system including:
      i) a flue gas cooling device in fluid communication with the heat engine and having a flue gas cooling device outlet, said flue gas cooling device configured to receive a fluid stream that is downstream from the heat engine and a cooled liquid coolant stream so that the fluid stream is cooled by the cooled liquid coolant stream and a cooled flue gas stream is formed, said cooled flue gas stream exiting the flue gas cooling device through the flue gas cooling device outlet;
      ii) a cryogenic carbon capture unit in fluid communication with the flue gas cooling device outlet and configured to receive at least a portion of the cooled flue gas stream and to separate carbon dioxide from the first portion of the cooled flue gas stream so that a clean flue gas stream and a carbon dioxide stream are formed;
      iii) a liquid coolant cooling device configured to receive the clean flue gas stream from the cryogenic carbon capture unit and a liquid coolant stream and to cool the liquid coolant stream using the clean flue gas stream so that the cooled liquid coolant stream is formed and provided to the flue gas cooling device;
   c. said heat engine in fluid communication with the cryogenic carbon capture system and configured to receive:
      i) a portion of a split stream that is downstream from the flue gas cooling device as an exhaust gas recirculation stream; and
      ii) an air stream.

2. The system of claim 1 wherein the clean flue gas stream has a temperature at or below an ambient temperature.

3. The system of claim 1 wherein the fluid stream received by the flue gas cooling device is the heat engine exhaust gas stream.

4. The system of claim 1 further comprising a heat recovery heat exchanger configured to receive the heat engine exhaust stream and a liquid stream and to cool the heat engine exhaust stream using the liquid stream so that the liquid stream is heated and a flue gas stream is formed as the fluid stream is received by the flue gas cooling device.

5. The system of claim 4 wherein the liquid stream received by the heat recovery heat exchanger is at least partially vaporized to form a vaporized stream and further comprising a steam turbine that is driven by the vaporized stream.

6. The system of claim 1 wherein the heat engine includes a combined-cycle turbine.

7. The system of claim 1 wherein the heat engine includes a simple-cycle turbine.

8. The system of claim 1 wherein the heat engine includes an internal combustion engine.

9. The system of claim 1 wherein the split stream is the cooled flue gas stream.

10. The system of claim 1 wherein the split stream is the clean flue gas stream.

11. The system of claim 1 wherein the heat engine receives the exhaust gas recirculation stream from the cryogenic carbon capture unit.

12. The system of claim 1 further comprising a dryer positioned between the flue gas cooling device and the cryogenic carbon capture unit, said dryer configured to receive the cooled flue gas stream from the flue gas cooling device outlet and to remove water from the cooled flue gas stream so that at least a partially dried flue gas stream is formed, said dryer having an outlet in fluid communication with the cryogenic carbon capture unit and the heat engine.

13. The system of claim 12 wherein the dryer uses a desiccant or a fluid.

14. The system of claim 12 further comprising a flow boosting device configured to receive the cooled flue gas stream from the flue gas cooling device outlet and to direct (i) the cooled flue gas stream to an inlet of the dryer or (ii) the exhaust gas recirculation stream to the heat engine.

15. The system of claim 1 further comprising:
   d. a first dryer having an outlet in fluid communication with the heat engine;
   e. a second dryer having an inlet in fluid communication with the outlet of the first dryer and an outlet in fluid communication with the cryogenic carbon capture unit;
   f. said first dryer configured to receive the cooled flue gas stream from the flue gas cooling device outlet, remove water from the cooled flue gas stream so that a partially dried flue gas stream is formed and direct the partially dried flue gas stream out of the first drying device outlet so that a first portion of the partially dried flue gas stream is directed to the inlet of the second drying device and a second portion of the partially dried flue gas stream is directed to the heat engine as the exhaust gas recirculation stream;

g. said second dryer configured to remove water from the first portion of the of the partially dried flue gas stream so that a further dried flue gas stream is formed and directed to the cryogenic carbon capture unit.

16. The system of claim 15 further comprising a waste heat recovery heat exchanger configured to cool the fluid stream that is downstream from the heat engine prior to the flue gas cooling device.

17. The system of claim 16 wherein the waste heat recovery heat exchanger is configured to receive a heat recovery stream from the cryogenic carbon capture unit, warm the heat recovery stream so that the fluid stream that is downstream from the heat engine is cooled and a return stream is formed, and direct the return stream to the cryogenic carbon capture unit.

18. The system of claim 1 further comprising a supplemental heat exchanger configured to cool the cooled flue gas stream prior to receipt by the cryogenic carbon capture unit and to warm the clean flue gas stream prior to receipt by the liquid coolant cooling device.

19. The system of claim 1 wherein the cryogenic carbon capture unit includes a cryogenic capture unit dryer configured to receive the cooled flue gas stream and wherein the split stream is downstream from the cryogenic capture unit dryer.

20. The system of claim 1 wherein the fluid stream that is downstream from the heat engine includes a portion of the heat engine exhaust stream.

21. The system of claim 1 wherein the fluid stream that is downstream from the heat engine includes the entire heat engine exhaust stream.

22. A method for separating carbon dioxide from an exhaust gas of a heat engine comprising the steps of:
   a. cooling a fluid stream downstream from the heat engine using a cooled liquid coolant stream so that a cooled flue gas stream is formed;
   b. separating carbon dioxide from the cooled flue gas stream in a cryogenic carbon capture process so that a clean flue gas stream and a carbon dioxide stream are formed;
   c. cooling a liquid coolant stream using the clean flue gas stream so that the cooled liquid coolant stream is formed;
   d. directing a portion of a split stream that is downstream from the cooling of step a. to the heat engine.

23. The method of claim 22 wherein the clean flue gas stream has a temperature at or below an ambient temperature.

24. The method of claim 22 wherein the fluid stream that is cooled in step a. is the heat engine exhaust gas stream.

25. The method of claim 22 further comprising the step of cooling the heat engine exhaust stream using a liquid stream so that the liquid stream is heated and a flue gas stream is formed as the fluid stream that is cooled in step a.

26. The method of claim 25 wherein the liquid stream is at least partially vaporized while cooling the heat engine exhaust stream to form a vapor stream and further comprising the step of directing the vapor stream to a steam turbine.

27. The method of claim 22 further comprising the step of drying the cooled flue gas stream of step a. to form a dried flue gas stream and wherein step b. includes separating carbon dioxide from a first portion of the dried flue gas stream.

28. The method of claim 27 wherein the step of drying the cooled flue gas stream includes use of a desiccant or a fluid.

29. The method of claim 22 further comprising the steps of cooling the cooled flue gas stream and the clean flue gas stream.

* * * * *